United States Patent
Im et al.

(10) Patent No.: US 9,798,182 B2
(45) Date of Patent: Oct. 24, 2017

(54) LIQUID CRYSTAL DISPLAY DEVICE

(71) Applicant: SAMSUNG DISPLAY CO., LTD., Yongin, Gyeonggi-Do (KR)

(72) Inventors: Wan Soon Im, Cheonan-si (KR); Nam Seok Roh, Seongnam-si (KR); Young Goo Song, Asan-si (KR); Hyoung Cheol Lee, Suwon-si (KR); Yong Woo Hyung, Suwon-si (KR); Hyung June Kim, Anyang-si (KR); Joong Gun Chong, Yongin-si (KR); Jong Hak Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 210 days.

(21) Appl. No.: 14/637,268

(22) Filed: Mar. 3, 2015

(65) Prior Publication Data
US 2016/0070135 A1 Mar. 10, 2016

(30) Foreign Application Priority Data
Sep. 4, 2014 (KR) ........................ 10-2014-0117710

(51) Int. Cl.
*G02F 1/1335* (2006.01)

(52) U.S. Cl.
CPC .. *G02F 1/133514* (2013.01); *G02F 1/133528* (2013.01); *G02F 2001/133538* (2013.01); *G02F 2201/52* (2013.01)

(58) Field of Classification Search
CPC ......... G02F 1/133514; G02F 1/133528; G02F 2201/52; G02F 2001/133538
See application file for complete search history.

(56) References Cited

U.S. PATENT DOCUMENTS

| | | | |
|---|---|---|---|
| 2006/0023143 A1* | 2/2006 | Lee .................. | G02B 27/26 349/102 |
| 2009/0147186 A1* | 6/2009 | Nakai ................ | G02F 1/13471 349/74 |
| 2013/0050282 A1* | 2/2013 | Kim .................. | G09G 3/3413 345/690 |

FOREIGN PATENT DOCUMENTS

| | | |
|---|---|---|
| JP | 5236422 B2 | 7/2013 |
| KR | 10-2008-0003102 A | 1/2008 |
| KR | 10-2011-0061914 A | 6/2011 |

(Continued)

OTHER PUBLICATIONS

Patent Abstracts of Japan for Japanese Patent Publication No. 2010-096974 Corresponding to Japanese Patent No. 5236422 B2, 1 Page.

*Primary Examiner* — Donald Raleigh
*Assistant Examiner* — Kevin Quarterman
(74) *Attorney, Agent, or Firm* — Lewis Roca Rothgerber Christie LLP

(57) ABSTRACT

A liquid crystal display (LCD) device, including a lower polarizing plate configured to have a transmission axis in a first direction, a liquid crystal layer on the lower polarizing plate, an upper polarizing plate on the liquid crystal layer, the upper polarizing plate including a first polarizing plate and a second polarizing plate, the first polarizing plate having a transmission axis in the first direction, the second polarizing plate having a transmission axis in a second direction perpendicular to the first direction, and color filters including a white filter and a colored filter, the white filter overlapping with the first polarizing plate, and the color filter overlapping with the second polarizing plate.

20 Claims, 12 Drawing Sheets

(56) References Cited

FOREIGN PATENT DOCUMENTS

| KR | 10-2013-0027915 A | 3/2013 |
|---|---|---|
| KR | 10-2013-0054110 A | 5/2013 |

\* cited by examiner

[Fig. 1]
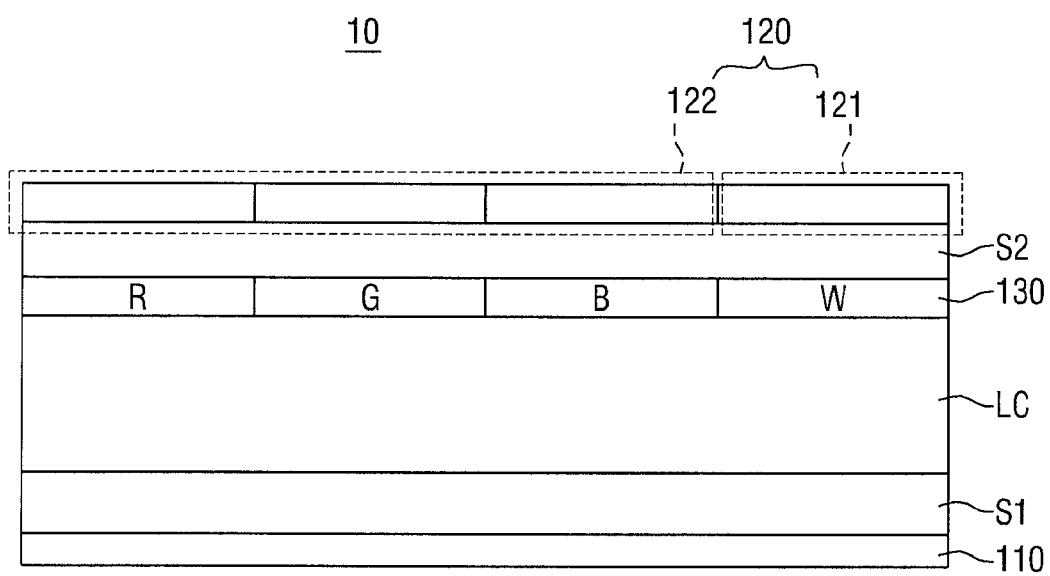

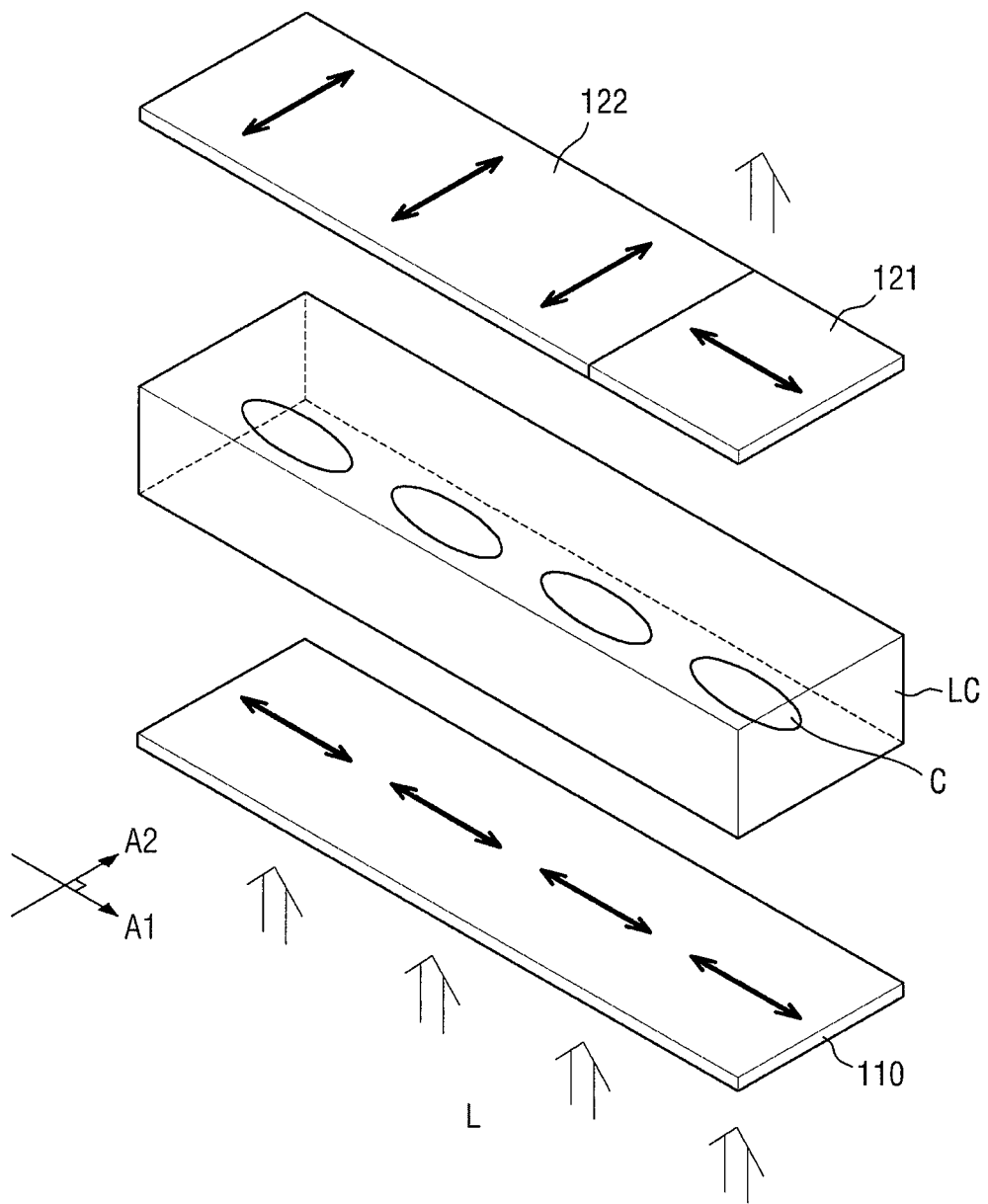

[Fig. 3]
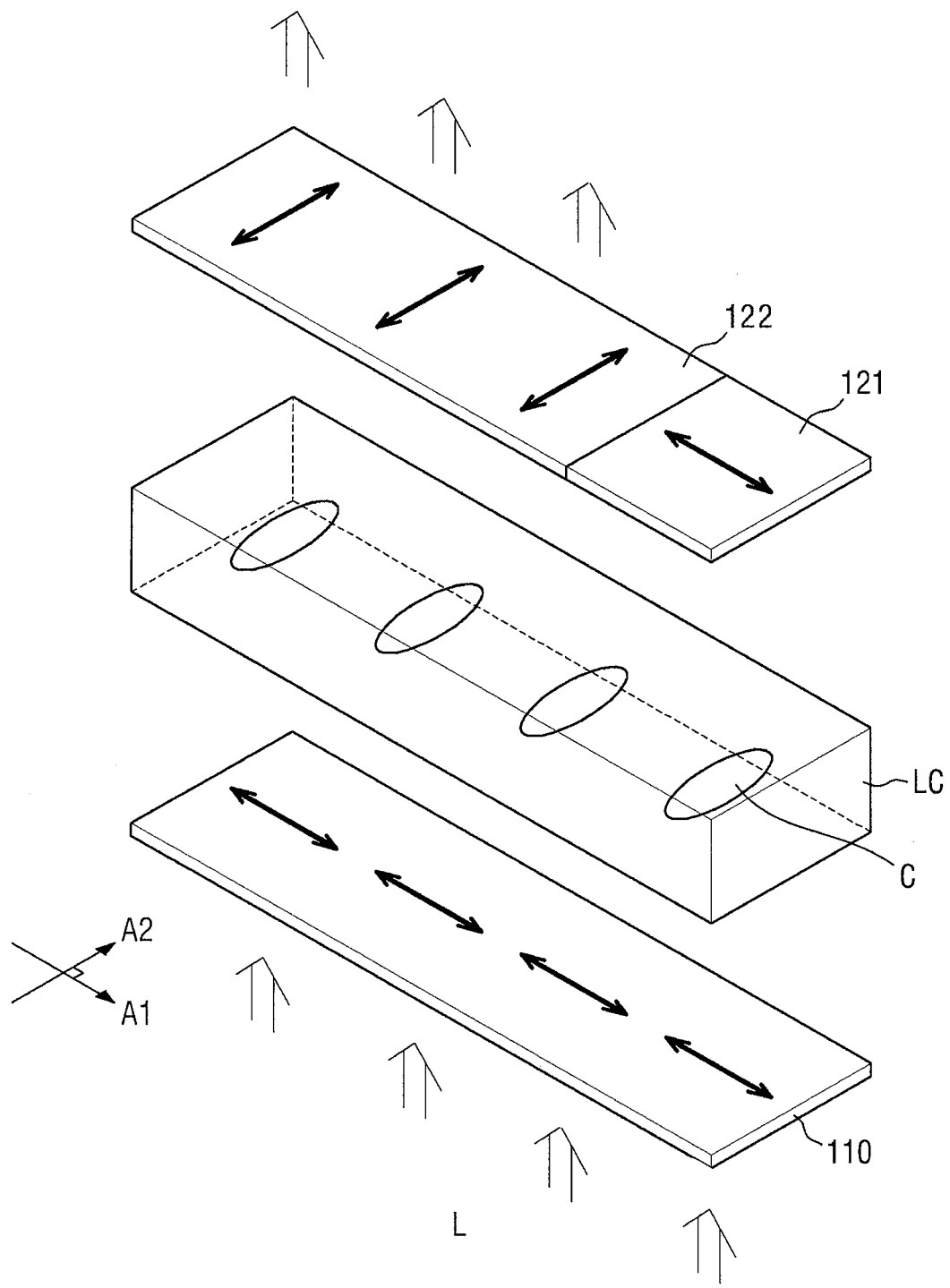

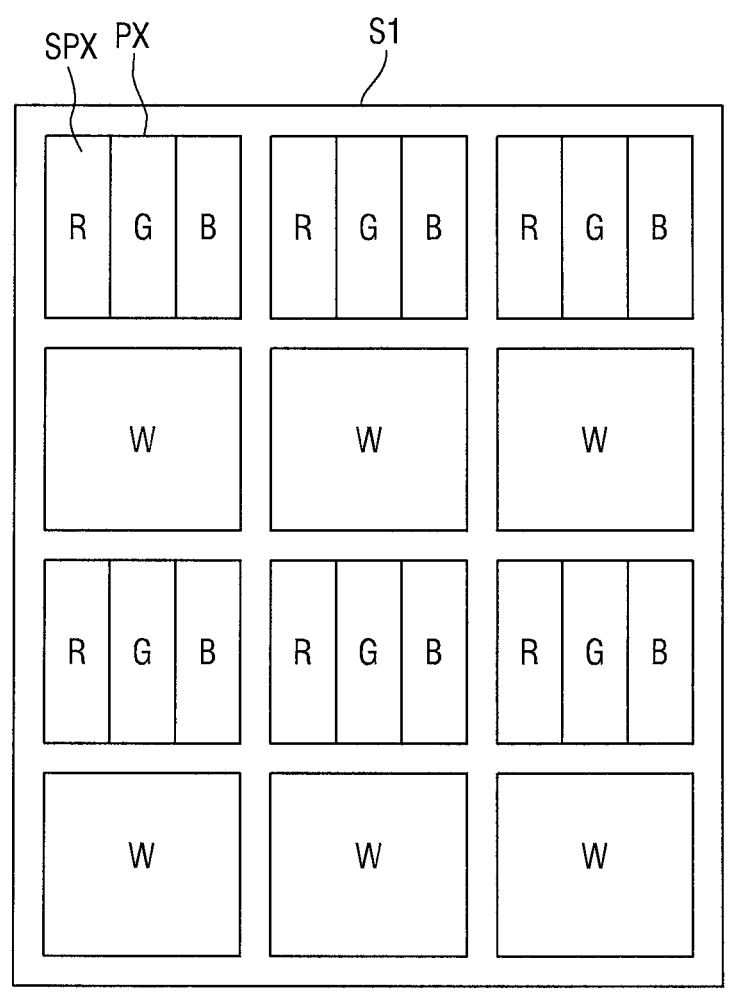
[Fig. 4]

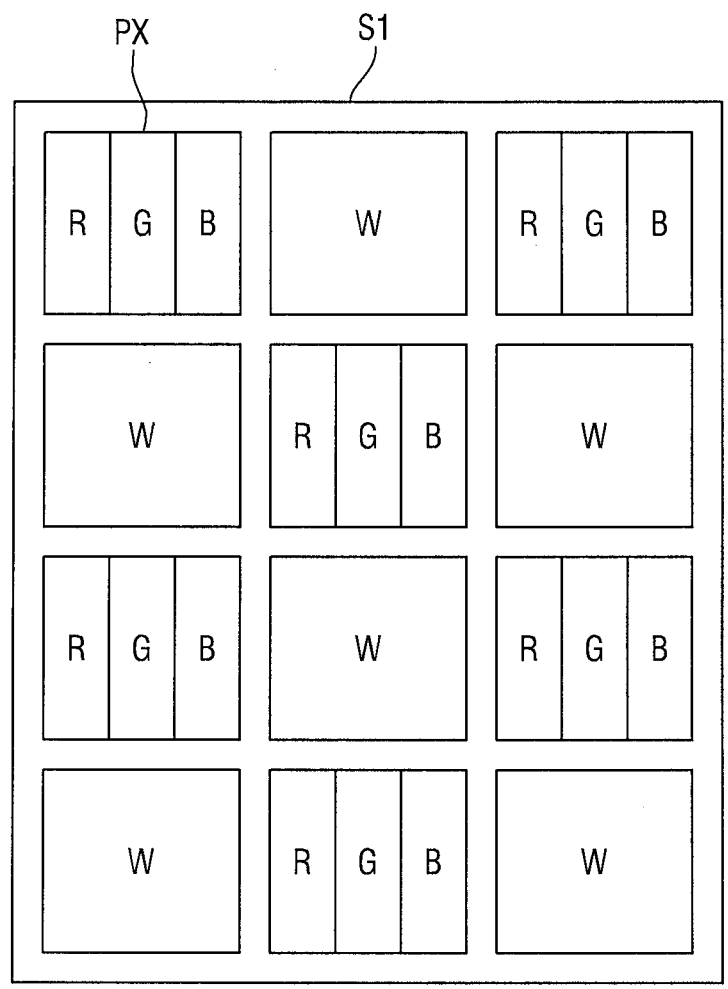
[Fig. 5]

[Fig. 6]
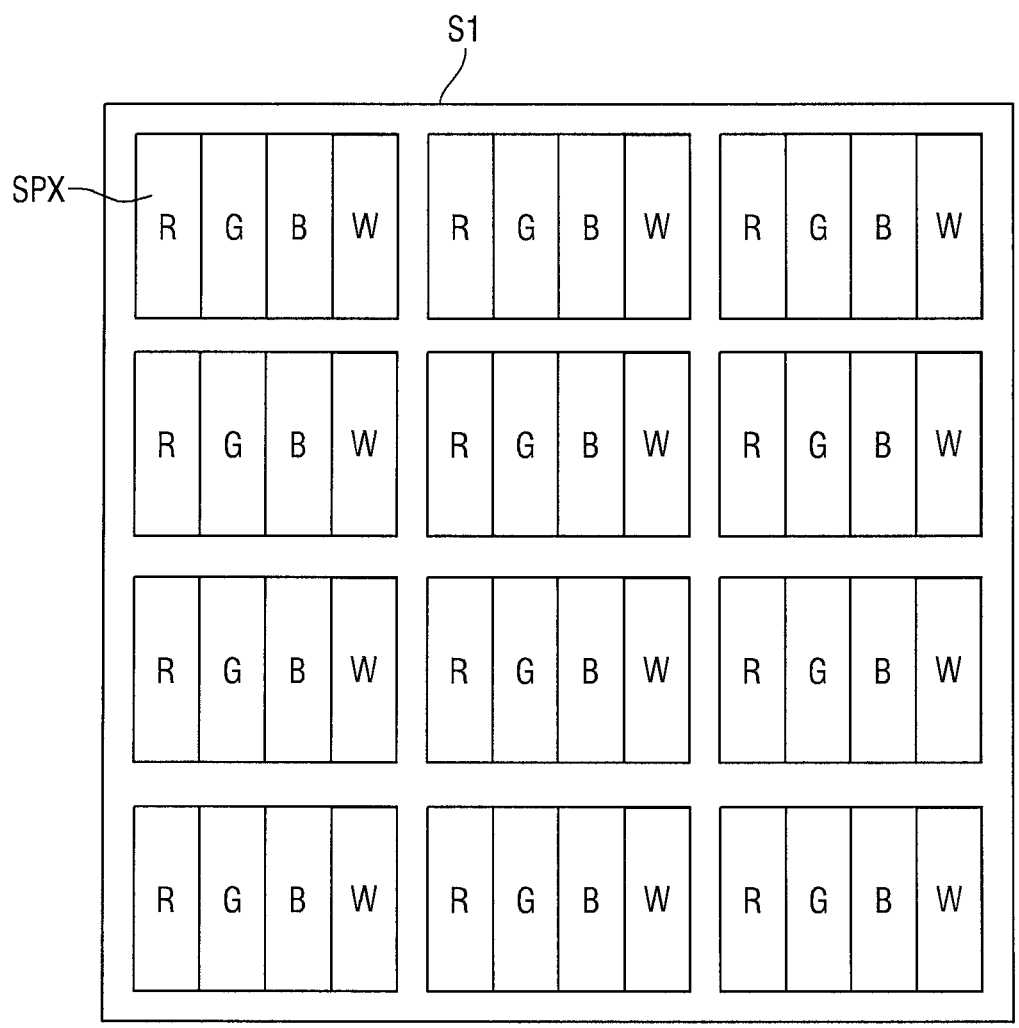

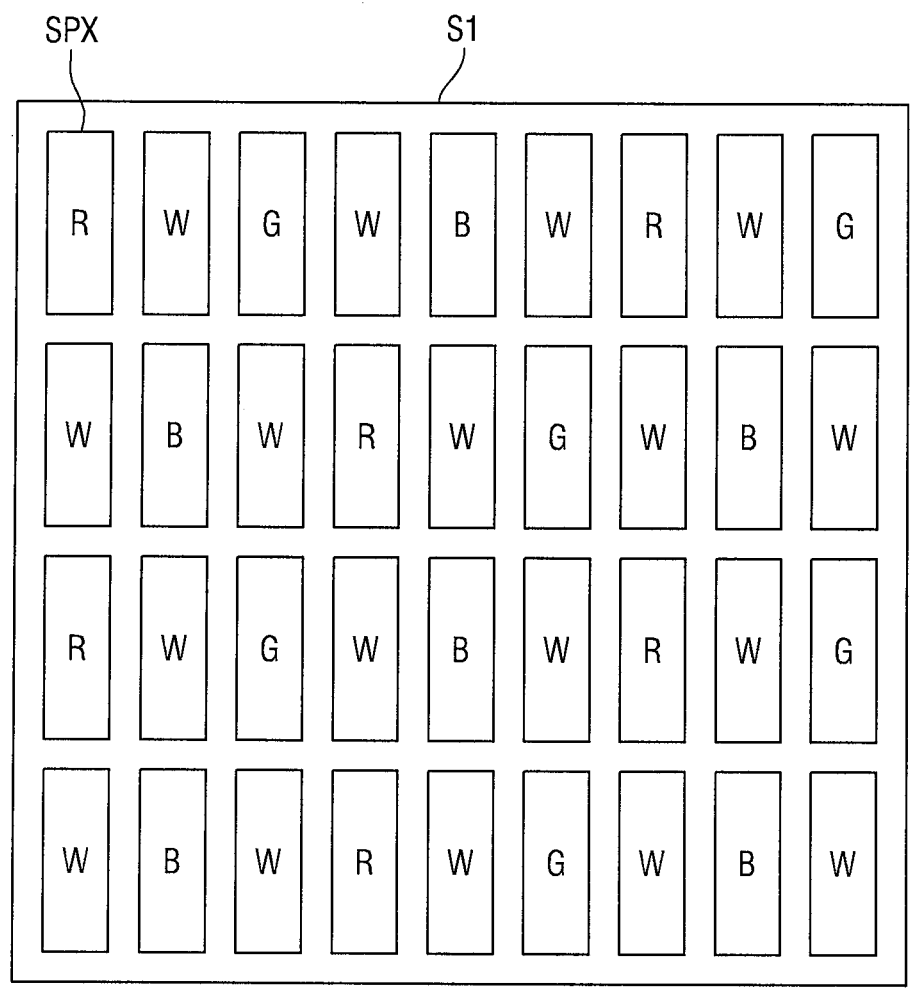
[Fig. 7]

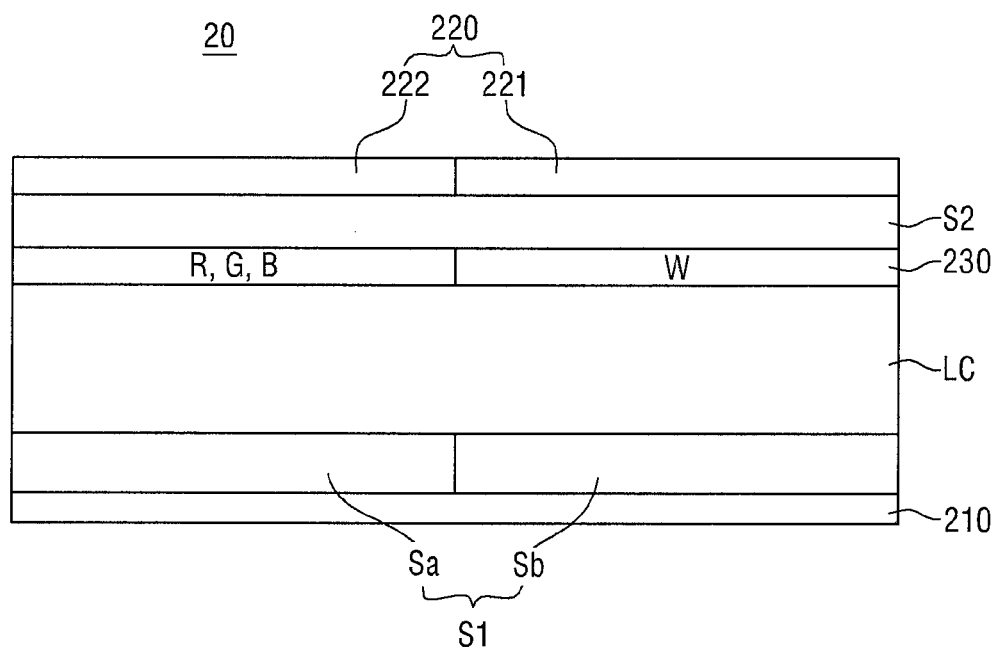
[Fig. 8]

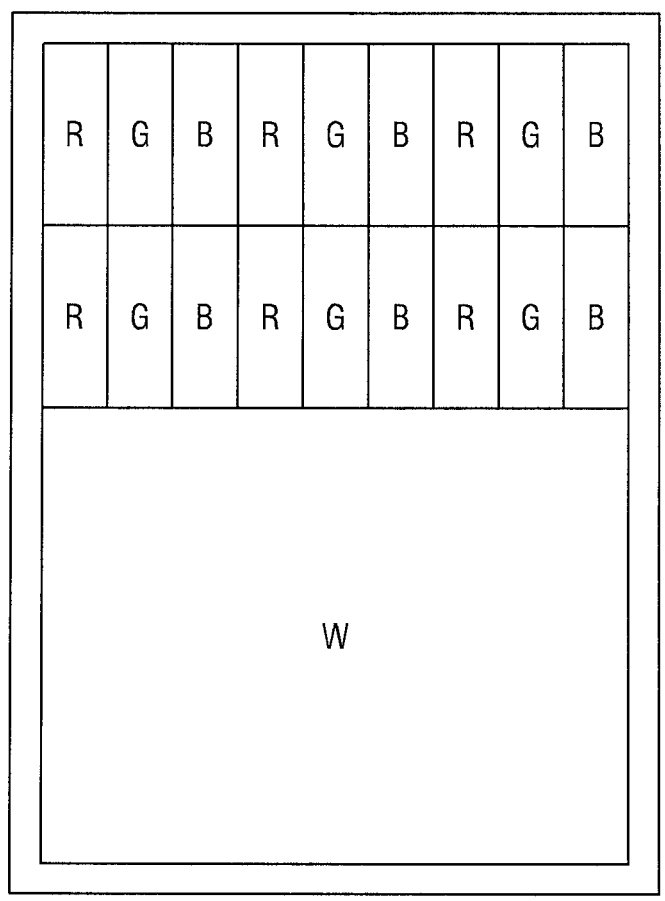
[Fig. 9]

[Fig. 10]
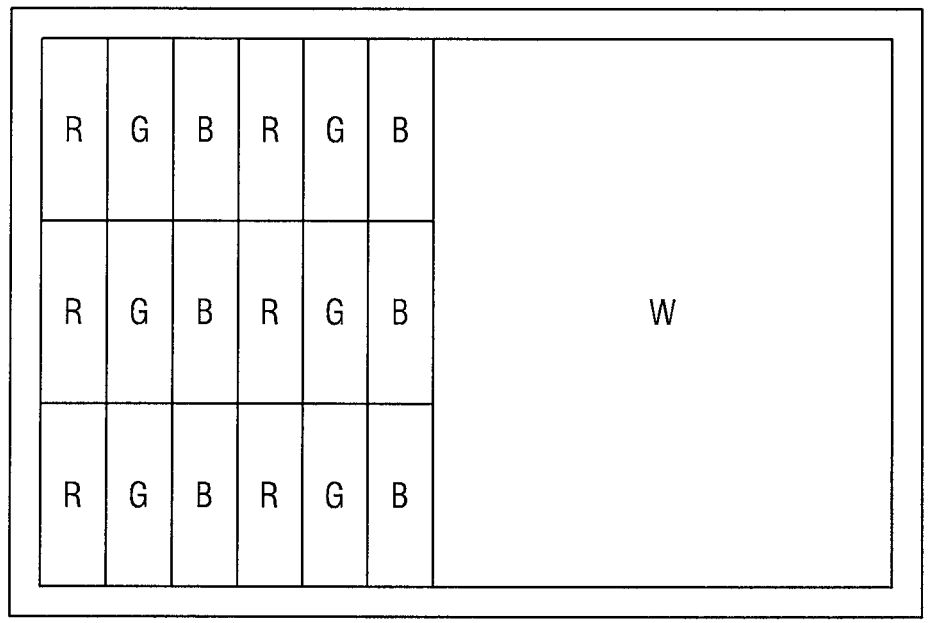

[Fig. 11]
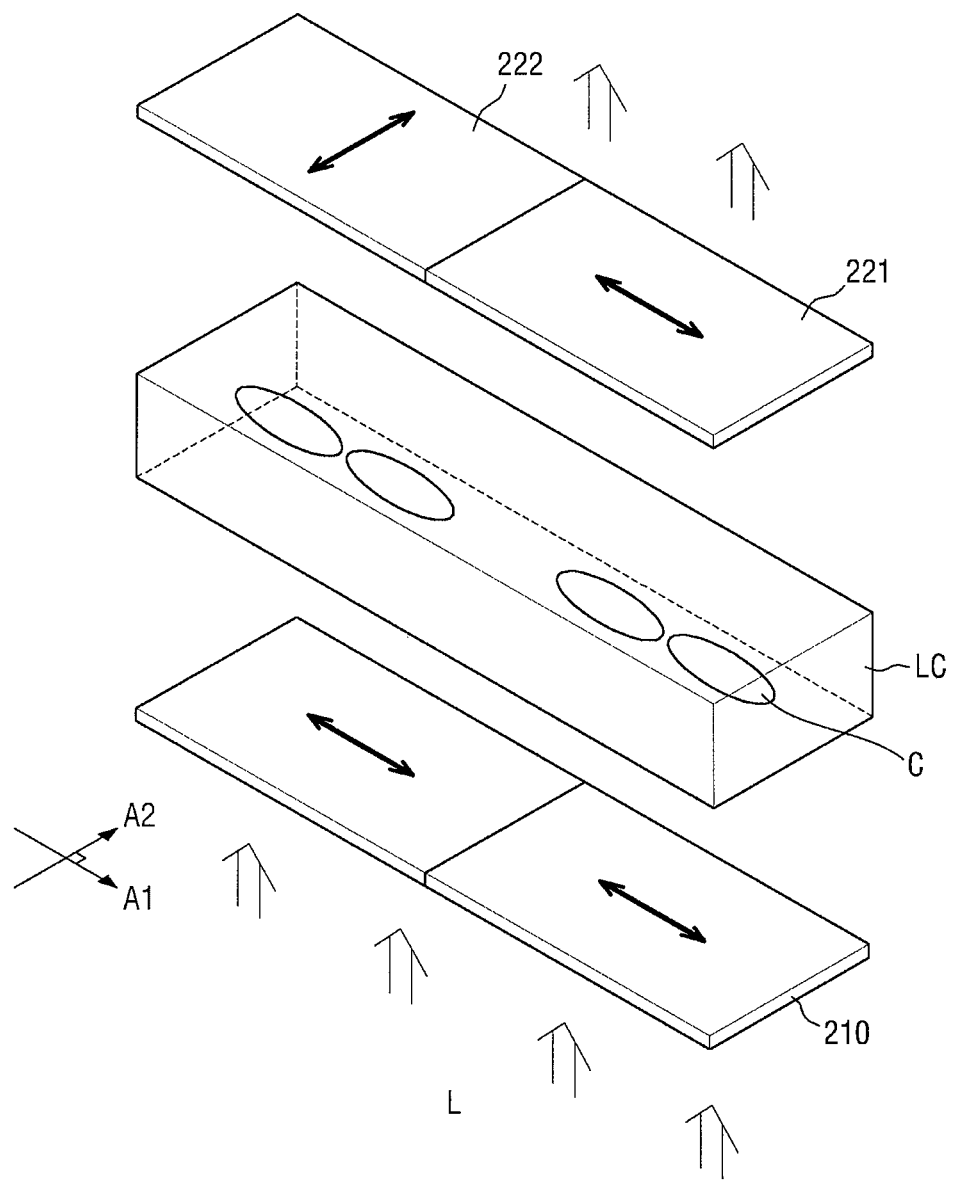

[Fig. 12]
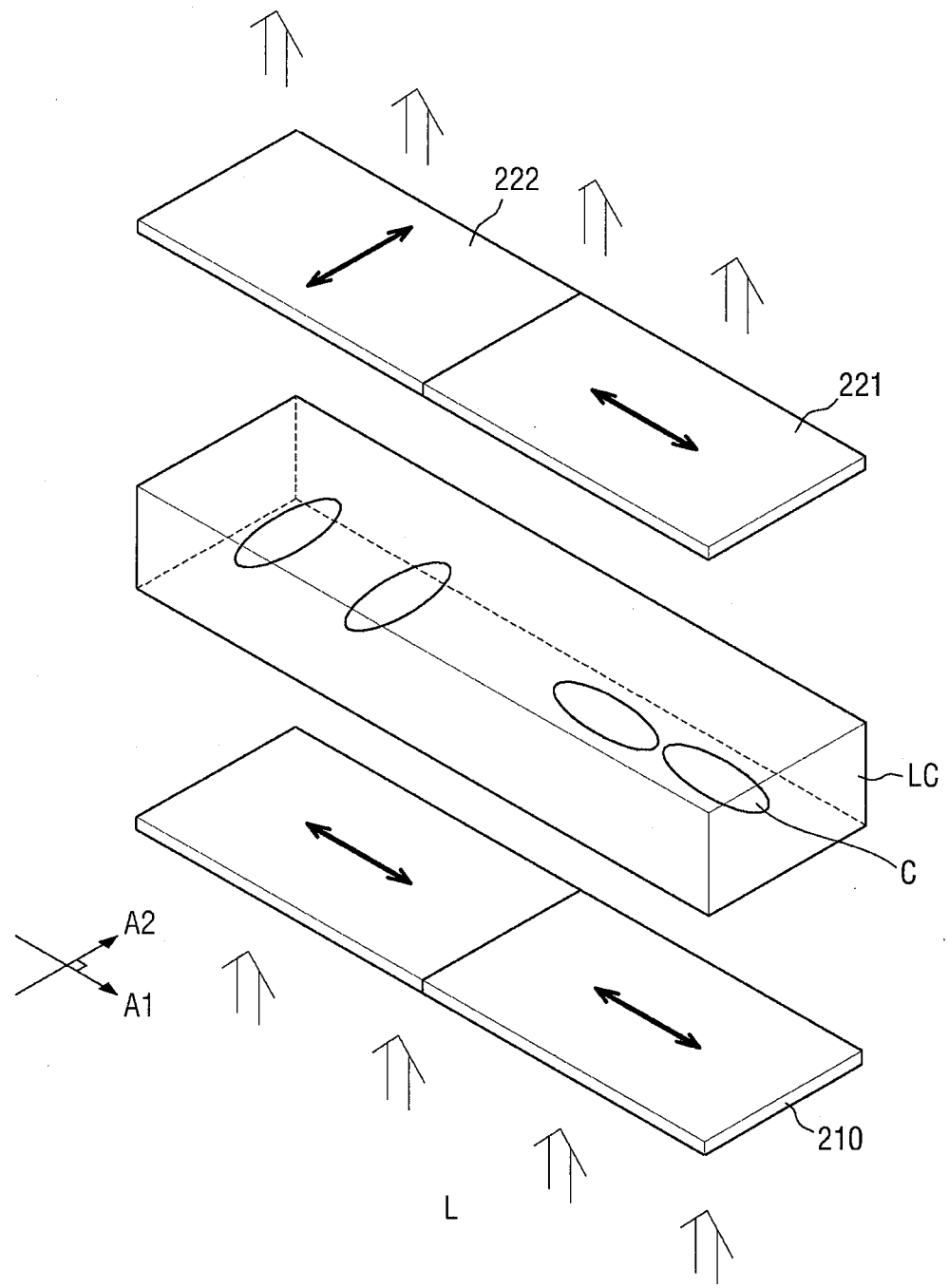

LIQUID CRYSTAL DISPLAY DEVICE

CROSS-REFERENCE TO RELATED APPLICATIONS

This application claims priority to and the benefit of Korean Patent Application No. 10-2014-0117710, filed on Sep. 4, 2014 in the Korean Intellectual Property Office, the disclosure of which is incorporated herein by reference in its entirety.

BACKGROUND

Field

Aspects of embodiments of the present invention relates to a liquid crystal display (LCD) device.

Description

A liquid crystal display (LCD) device can be implemented, by increasing the optical transmissivity of a display panel thereof, as a transparent display device capable of displaying an image of the background of the display panel. A related art LCD device is provided with a white area in a color filter region to improve the optical transmissivity thereof. Because light emitted from a backlight can penetrate the white area almost without being interfered with, the optical transmissivity of the related art LCD device can be improved.

Currently, a transparent LCD device is implemented as being in a "normally black" state. That is, the display panel of the transparent LCD device is non-transmissive when turned off, and can realize a transparent state and an image when turned on. However, to maintain the transparent state, the display panel of the transparent LCD device must be turned on. Accordingly, the power consumption of the transparent LCD device may increase.

Also, because white pixels are driven to realize an image during the transparent state, the luminance of the display panel of the transparent LCD device may increase, but the color reproducibility of the display panel of the transparent LCD device may decrease. As a result, degradation in the quality of the display, such as image blur, may occur.

SUMMARY

Aspects of embodiments of the present invention are directed toward a liquid crystal display (LCD) device capable of not only lowering power consumption while maintaining a transparent state even when turned off, but also increasing color reproducibility so as to improve the quality of display.

However, example embodiments of the present invention are not restricted to those set forth herein. The above and other example embodiments of the present invention will become more apparent to one of ordinary skill in the art to which the present invention pertains by referencing the detailed description of the present invention given below.

According to an embodiment of the present invention, there is provided a liquid crystal display (LCD) device, including: a lower polarizing plate configured to have a transmission axis in a first direction; a liquid crystal layer on the lower polarizing plate; an upper polarizing plate on the liquid crystal layer, the upper polarizing plate including a first polarizing plate and a second polarizing plate, the first polarizing plate having a transmission axis in the first direction, the second polarizing plate having a transmission axis in a second direction perpendicular to the first direction; and color filters including a white filter and a colored filter, the white filter overlapping with the first polarizing plate, and the color filter overlapping with the second polarizing plate.

In an embodiment, the LCD device further includes: an array substrate at the bottom of the liquid crystal layer, the array substrate including a plurality of pixels arranged in a matrix; and an encapsulation substrate at the top of the liquid crystal layer and encapsulating the liquid crystal layer.

In an embodiment, the lower polarizing plate is at the top or the bottom of the array substrate, and the upper polarizing plate is at the top or the bottom of the encapsulation substrate.

In an embodiment, each of the pixels overlaps with the white filter or the colored filter.

In an embodiment, each of the pixels includes a plurality of sub-pixels, and each of the sub-pixels overlaps with the white filter or the colored filter.

In an embodiment, the white filter and the colored filter are alternately arranged in a row direction or in a column direction.

In an embodiment, the white filter and the colored filter are alternately arranged in a row direction and a column direction.

In an embodiment, the liquid crystal layer includes a plurality of liquid crystal molecules aligned in the first direction.

In an embodiment, at least a portion of the plurality of liquid crystal molecules in a region overlapping with the first polarizing plate are configured to remain aligned in the second direction while a voltage is applied to the liquid crystal layer.

In an embodiment, the liquid crystal molecules are configured to change their alignment according to a voltage applied to the liquid crystal layer.

According to an embodiment of the present invention, there is provided an LCD display device, including: an array substrate including a first area and a second area, the first area overlapping with a white filter, and the second area overlapping with a colored filter; and an upper polarizing plate and a lower polarizing plate facing each other with the array substrate interposed therebetween, wherein the lower polarizing plate is further configured to have a transmission axis in a first direction, the upper polarizing plate includes a first polarizing plate having a transmission axis in the first direction, and a second polarizing plate having a transmission axis in a second direction that is perpendicular to the first direction, the first area overlaps with the first polarizing plate, and the second area overlaps with the second polarizing plate.

In an embodiment, the LCD display device further includes: an encapsulation substrate facing the array substrate and seal the array substrate; and a liquid crystal layer between the encapsulation substrate and the array substrate.

In an embodiment, wherein the lower polarizing plate is further configured to be located at the top or the bottom of the array substrate and the upper polarizing plate is further configured to be located at the top or the bottom of the encapsulation substrate.

In an embodiment, wherein the liquid crystal layer includes a plurality of liquid crystal molecules aligned in the first direction.

In an embodiment, wherein at least a portion of the plurality of liquid crystal molecules in the first area are configured to remain aligned in the first direction while a voltage is applied to the liquid crystal layer.

In an embodiment, wherein the liquid crystal molecules are configured to change their alignment according to a voltage applied to the liquid crystal layer.

In an embodiment, wherein the first area and the second area are defined by an imaginary line that vertically or horizontally extends across the array substrate.

According to an embodiment of the present invention, there is provided an LCD device, including: an array substrate including a colored pixel and a white pixel; and an upper polarizing plate and a lower polarizing plate facing each other with the array substrate interposed therebetween, wherein part of the upper polarizing plate overlapping with the white pixel has a transmission axis in the same direction as a transmission axis of the lower polarizing plate, and part of the upper polarizing plate overlapping with the colored pixel has a transmission axis in a direction perpendicular to the transmission axis of the lower polarizing plate.

In an embodiment, the array substrate is further configured to maintain an alignment of liquid crystal molecules included in the white pixel in the direction perpendicular to the transmission axis of the lower polarizing plate, while the LCD device is displaying an image.

In an embodiment, wherein the colored pixel and the white pixel are defined by an imaginary line that vertically or horizontally extends across the array substrate.

According to the example embodiments, it is possible to lower the power consumption of an LCD device by providing a transparent state even when the LCD device is turned off. Also, it is possible to provide an improved quality of display by increasing color reproducibility during the driving of the LCD device.

Other features and example embodiments will be apparent from the following detailed description, the drawings, and the claims.

BRIEF DESCRIPTION OF THE DRAWINGS

FIG. 1 is a cross-sectional view of a liquid crystal display (LCD) device, according to an example embodiment of the present invention.

FIG. 2 is a schematic view illustrating the transmission of light through a liquid crystal layer illustrated in FIG. 1 in response to the application of no voltage to the liquid crystal layer.

FIG. 3 is a schematic view illustrating the transmission of light through the liquid crystal layer in response to the application of a voltage to the liquid crystal layer.

FIGS. 4 to 7 are plan views of examples of an array substrate illustrated in FIG. 1.

FIG. 8 is a cross-sectional view of an LCD device, according to another example embodiment of the present invention.

FIGS. 9 and 10 are plan views of examples of an array substrate illustrated in FIG. 8.

FIGS. 11 and 12 are schematic views illustrating the transmission of light through a liquid crystal layer illustrated in FIG. 8 in response to the application of a voltage to the liquid crystal layer.

DETAILED DESCRIPTION

The aspects and features of the present invention and methods for achieving the aspects and features will be apparent by referring to the embodiments to be described in more detail with reference to the accompanying drawings. However, the present invention is not limited to the embodiments disclosed hereinafter, and can be implemented in diverse forms. The matters defined in the description, such as the detailed construction and elements, are nothing but specific details provided to assist those of ordinary skill in the art in a comprehensive understanding of the present invention, and the present invention is only defined within the scope of the appended claims, and equivalents thereof.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "lower", "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept."

It will be understood that when an element or layer is referred to as being "connected to", "coupled to", or "adjacent to" another element or layer, it can be directly on, connected to, coupled to, or adjacent to the other element or layer, or one or more intervening elements or layers may be present. As used herein, the term "substantially," "about," and similar terms are used as terms of approximation and not as terms of degree, and are intended to account for the inherent deviations in measured or calculated values that would be recognized by those of ordinary skill in the art.

The term "on" that is used to designate that an element is on another element or located on a different layer or a layer includes both a case where an element is located directly on another element or a layer and a case where an element is located on another element via another layer or still another element. In the entire description of the present invention, the same drawing reference numerals are used for the same elements across various suitable figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Example embodiments will hereinafter be described with reference to the accompanying drawings.

FIG. 1 is a cross-sectional view of a liquid crystal display (LCD) device, according to an example embodiment of the present invention. FIG. 2 is a schematic view illustrating the transmission of light through a liquid crystal layer illustrated in FIG. 1 in response to the application of no voltage to the liquid crystal layer. FIG. 3 is a schematic view illustrating the transmission of light through the liquid crystal layer in response to the application of a voltage to the liquid crystal layer. FIGS. 4 to 7 are plan views of examples of an array substrate illustrated in FIG. 1.

Referring to FIGS. 1 to 7, an LCD device 10 includes a lower polarizing plate 110, a liquid crystal layer LC, an upper polarizing plate 120, a plurality of color filters 130, an array substrate S1 and an encapsulation substrate S2.

The liquid crystal layer LC may be interposed between the array substrate S1 and the encapsulation substrate S2. The liquid crystal layer LC may be formed on the lower polarizing plate 110. The liquid crystal layer LC may include a plurality of liquid crystal molecules C. The liquid crystal molecules C may be aligned in a direction (e.g., a predetermined direction). The liquid crystal molecules C, which are aligned in the direction (e.g., the predetermined direction), may change the path of light applied thereto from therebelow. The liquid crystal molecules C may change the polarization direction of light applied thereto to correspond to their alignment direction.

The array substrate S1 may include one or more pixel electrodes, and the encapsulation substrate S2 may include a common electrode. The array substrate S1 may include one or more transistors, which control a voltage applied to the pixel electrodes. The level of a voltage applied to the liquid crystal layer LC may vary depending on an electric field formed between the pixel electrodes and the common electrodes. The alignment direction of the liquid crystal molecules C may change according to the voltage applied to the liquid crystal layer LC. In response to no voltage being applied to the liquid crystal layer LC, the liquid crystal molecules C may be aligned in a first direction A1, as illustrated in FIG. 2. On the other hand, in response to a voltage being applied to the liquid crystal layer LC, the liquid crystal molecules C may be aligned in a second direction A2, which is substantially perpendicular to the first direction A1. The array substrate S1 may control a voltage that is formed in the liquid crystal layer LC, and may also control the path and intensity of light incident upon, and emitted from, the liquid crystal layer LC.

The lower polarizing plate 110 and the upper polarizing plate 120 may be located at the bottom and the top, respectively, of the liquid crystal layer LC, and may linearly polarize light incident upon, and emitted from, the liquid crystal layer LC. In an example embodiment, the lower polarizing plate 110 may be below (e.g., located at the bottom of) the array substrate S1, and the upper polarizing plate 120 may be above (e.g., located at the top of) the encapsulation substrate S2. However, the present invention is not limited to this example embodiment. For example, the lower polarizing plate 110 may be above (e.g., located at the top of) the array substrate S1, and the upper polarizing plate 120 may be below (e.g., located at the bottom) of the encapsulation substrate S2.

The lower polarizing plate 110 may have a transmission axis along the first direction A1. For example, light L, which is emitted from a backlight located below the lower polarizing plate 110, may penetrate the lower polarizing plate 110 to be linearly polarized in the first direction A1. After being linearly polarized by the lower polarizing plate 110, the light L may be incident upon the liquid crystal layer LC, and may be linearly polarized again depending on the alignment direction of the liquid crystal molecules C in the liquid crystal layer LC. More specifically, in response to the alignment direction of the liquid crystal molecules C coinciding with the polarization direction of the light L, the light L may penetrate the liquid crystal layer LC with little to no changes to the polarization direction thereof, as illustrated in FIG. 2. On the other hand, in response to the alignment direction of the liquid crystal molecules C not coinciding with the polarization direction of the light L, the light L may penetrate the liquid crystal layer LC with its polarization direction changed to the alignment direction of the liquid crystal molecules C.

The upper polarizing plate 120 may include a first polarizing plate 121 and a second polarizing plate 122. The first polarizing plate 121 may have a transmission axis along the first direction A1, and the second polarizing plate 122 may have a transmission axis along the second direction A2, which is perpendicular to the first direction A1. That is the upper polarizing plate 120 may have two polarizing plates with their transmission axes perpendicular to each other, i.e., the first polarizing plate 121 and the second polarizing plate 122. The transmission axis of the first polarizing plate 121 may coincide with the transmission axis of the lower polarizing plate 110, and the transmission axis of the second polarizing plate 122 may be perpendicular to the transmission axis of the lower polarizing plate 110. An area overlapping with the first polarizing plate 121 may be in a "normally white" state, and an area overlapping with the second polarizing plate 122 may be in a "normally black" state.

In response to no voltage being applied to the liquid crystal layer LC (e.g., electrical field being formed in the liquid crystal layer LC), the light L, which is emitted from the backlight, may be emitted from the top of the LCD device 10 through the first polarizing plate 121, but not through the second polarizing plate 122. In response to the liquid crystal molecules C being aligned in a perpendicular direction to their previous alignment direction upon the application of a voltage to the liquid crystal layer LC, the light L, which is emitted from the backlight, may be emitted from the top of the LCD device 10 through the second polarizing plate 122, but not through the first polarizing plate 121.

The first polarizing plate 121 may overlap with a white filter W, which is a color filter 130, and the second polarizing plate 122 may overlap with a colored filter (R, G, or B), which is also a color filter 130. The color filters 130 may be located between the liquid crystal layer LC and the encapsulation substrate S2, as illustrated in FIG. 1, but the present invention is not limited thereto. For example, the color filters 130 may be located between the liquid crystal layer LC and the array substrate S1.

The color filters 130 may filter the light L to substantially only transmit light of a particular wavelength therethrough. The light L, which is emitted from the backlight, may be white light, and the white light L may penetrate the color filters 130 to be converted into light of a particular color (e.g., a predetermined color).

The color filters 130 may include the colored filter (R, G, or B) and the white filter W. The colored filter (R, G, or B) may include a red filter R transmitting red light therethrough, a green filter G transmitting green light therethrough, and a blue filter B transmitting blue light therethrough, but the present invention is not limited thereto. The white filter W may transmit the light L without changing the color of the light L. The white filter W may include a transparent material, but the present invention is not limited thereto. In an example embodiment, the white filter may be an opening where the colored filter (R, G, or B) does not exist or is not provided.

In response to no voltage being applied to the liquid crystal layer LC, the light L may be emitted from the top of the LCD device 10 through the first polarizing plate 121, which overlaps with the white filter W. That is, when no power is applied to the liquid crystal layer LC, the LCD device 10 may be partially in the "normally white" state, and may have high transmissivity.

In response to a voltage being applied to the liquid crystal layer LC, the light L may be emitted from the top of the LCD device 10 through the second polarizing plate 122, which overlaps with the colored filter (R, G, or B). That is, the alignment of liquid crystal molecules C in a region that overlaps with the second polarizing plate 122 may change depending on the level of a voltage applied to the liquid crystal layer LC, and as a result, the amount of light emitted from the top of the LCD device 10 may vary. Light emitted through the liquid crystal layer LC may penetrate the colored filter (R, G, or B), and may display an image as a whole.

Liquid crystal molecules C in a region that overlaps with the first polarizing plate 121 may be aligned in a perpendicular direction to their previous alignment direction with no power applied to the liquid crystal layer LC. That is, during the application of a voltage to the liquid crystal layer LC, the liquid crystal molecules C in the region that overlaps with the first polarizing plate 121 may be aligned in the second direction A2, and may maintain their alignment in the second direction A2. In other words, a data voltage for sustaining the vertical alignment of liquid crystal molecules C may be applied every frame to one or more transistors that control the liquid crystal molecules C in the region that overlaps with the first polarizing plate 121. Accordingly, the light L cannot be emitted outward through the first polarizing plate 121. That is, an image may be displayed by utilizing (e.g., with the use of) the colored filter (R, G, or B), which correspond to primary colors, without displaying white light, and as a result, color reproducibility may be improved.

Because the LCD device 10 can provide high transmissivity, which is a requirement for implementing a transparent display device, without the need to apply power to the liquid crystal layer LC, the power consumption of the LCD device 10 can be lowered. Also, because an image can be realized by utilizing (e.g., with the use of) the colored filter (R, G, or B), high color reproducibility can be achieved.

The array substrate S1 may include a plurality of pixels PX, which are arranged in a matrix. Each of the pixels PX may include a plurality of sub-pixels SPX. Each of the sub-pixels SPX may include a transistor, which is controlled by a gate line and is provided with a data voltage via a data line. The area of each of the sub-pixels SPX may be substantially the same as the area of a pixel electrode coupled to (e.g., connected to) the transistor of a corresponding sub-pixel SPX.

Each of the pixels PX may overlap with the colored filter (R, G, or B) or the white filter W, as illustrated in FIG. 4. Each of the sub-pixels SPX may overlap with one of the red, green and blue filters R, G and B of the colored filter (R, G, or B). The first polarizing plate 121 and the second polarizing plate 122 may have different areas from each other. The area of the second polarizing plate 122 may correspond to one sub-pixel SPX, and the area of the first polarizing plate 121 may correspond to one pixel PX. The white filter W, which is in the "normally white" state due to overlapping with the first polarizing plate 121, may overlap with one pixel PX and may thus provide even higher transmissivity. The colored filter (R, G, or B) and the white filter W may be alternately arranged in a row direction or a column direction, but the present invention is not limited thereto.

In an alternative example embodiment, the colored filter (R, G, or B) and the white filter W may be alternately arranged in both the row direction and in the column direction, as illustrated in FIG. 5. Accordingly, flickering and any resolution degradation may be reduced (e.g., minimized) that may be caused by arranging one or more white filters W in rows.

In an example embodiment, the white filter W and one of the red, green and blue filters R, G and B of the colored filter (R, G, or B) may each be configured to overlap with one sub-pixel SPX, as illustrated in FIG. 6. In this example embodiment, the area of the first polarizing plate 121 may be substantially the same as the second polarizing plate 122. That is, the second polarizing plate 122 may be formed to have substantially the same area as the first polarizing plate 121 in consideration of any resolution degradation that may be caused by providing a relatively large "normally white" area. The alignment of the liquid crystal molecules C in the region that overlaps with the first polarizing plate 121, like the alignment of the liquid crystal molecules C in the region that overlaps with the second polarizing plate 122, may be changed in response to a voltage being applied to the liquid crystal layer LC. That is, during the application of a voltage to the liquid crystal layer LC, the liquid crystal molecules C in the region that overlaps with the first polarizing plate 121 may not be fixed in the second direction A2. The sub-pixel SPX overlapping with the white filter W may display an image along with the sub-pixel SPX overlapping with the colored filter (R, G, or B). Because the white filter W is configured to occupy a small area, any degradation in color reproducibility may be reduced (e.g., minimized) even if white pixels are displayed, and any degradation in resolution may be prevented that may be caused by not driving white pixels.

In an example embodiment, the white filter W may be located among the red, green and blue filters R, G and B of the colored filter (R, G, or B), as illustrated in FIG. 7. Accordingly, flickering and any resolution degradation may be reduced (e.g., minimized) that may be caused by arranging one or more white filters W in rows.

An LCD device according to another example embodiment of the present invention will hereinafter be described.

FIG. 8 is a cross-sectional view of an LCD device, according to another example embodiment of the present invention. FIGS. 9 and 10 are plan views of examples of an array substrate illustrated in FIG. 8. FIGS. 11 and 12 are schematic views illustrating the transmission of light through a liquid crystal layer illustrated in FIG. 8 in response to the application of a voltage to the liquid crystal layer.

Referring to FIGS. 8 to 12, an LCD device 20 includes a lower polarizing plate 210, a liquid crystal layer LC, an upper polarizing plate 220, a white filter W, a colored filter (R, G, or B), an array substrate S1 and an encapsulation substrate S2.

The liquid crystal layer LC may be interposed between the array substrate S1 and the encapsulation substrate S2. The liquid crystal layer LC may be formed on the lower polarizing plate 110. The liquid crystal layer LC may include a plurality of liquid crystal molecules C. The liquid crystal molecules C may be aligned in a direction (e.g., a predetermined direction). The liquid crystal molecules C, which are aligned in the direction (e.g., the predetermined direction), may change the path of light applied thereto from therebelow. The liquid crystal molecules C may change the polarization direction of light applied thereto to correspond to their alignment direction.

The array substrate S1 may include one or more pixel electrodes, and the encapsulation substrate S2 may include a common electrode. The array substrate S1 may include one or more transistors, which control a voltage applied to the pixel electrodes. The level of a voltage applied to the liquid crystal layer LC may vary depending on an electric field formed between the pixel electrodes and the common electrodes. The alignment direction of the liquid crystal molecules C may change according to the voltage applied to the liquid crystal layer LC.

The array substrate S1 may include a first area Sb and a second area Sa. The first area Sb may be a region that overlaps with the white filter W. The second area Sa may be a region that overlaps with the colored filter (R, G, or B). That is, the array substrate S1 may be divided into the first area Sb, which includes a white pixel that controls the amount of light transmitted through the white filter W, and the second area Sa, which includes a colored pixel that controls the amount of light transmitted through the colored filter (R, G, or B). The first area Sb and the second area Sa may be defined by an imaginary line that horizontally extends' across the array substrate S1, as illustrated in FIG. 9, but the present invention is not limited thereto. For example, the first area Sb and the second area Sa may be defined by an imaginary line that vertically extends across the array substrate S1, as illustrated in FIG. 10. Because the first area Sb overlaps with the white filter W, the first area Sb may display only a white color or a black color due to the luminance control performed by the liquid crystal layer LC. Because the second area Sa overlaps with the colored filter (R, G, or B), the second area Sa may display a variety of natural colors.

A first polarizing plate 221 of the upper polarizing plate 220 overlaps with the white filter W, and may have a transmission axis perpendicular to the transmission axis of the lower polarizing plate 210, which is located below the first polarizing plate 221. A second polarizing plate 222 of the upper polarizing plate 220 overlaps with the colored filter (R, G, or B), and may have a transmission axis in the same direction as the transmission axis of the lower polarizing plate 210, which is located below the second polarizing plate 222. For example, the lower polarizing plate 210 and the second polarizing plate 222 may both have a transmission axis in a first direction A1, and the first polarizing plate 221 may have a transmission axis in a second direction A2, which is perpendicular to the first direction A1. The liquid crystal molecules C may be aligned in the first direction A1 before the application of a voltage to the liquid crystal layer LC.

For example, the first area Sb may be in a "normally white" state, and the second area Sa may be in a "normally black" state. Accordingly, the first area Sb may transmit therethrough light L applied thereto from a backlight, and may provide high transmissivity. The first area Sb may be in a transparent display state. A user of the LCD device 20 can recognize an image at the rear of the LCD device 20 through the first area Sb. That is, a certain part of the LCD device 20 may be implemented as being in the transparent display state. Accordingly, the power consumption of the LCD device 20 may be lowered.

The LCD device 20 may display an image by selectively applying a voltage only to the second area Sa. Because an image can be displayed with the second area Sa where no white pixel is provided, any degradation in color reproducibility may be prevented. During the application of a voltage to the liquid crystal layer LC, the liquid crystal molecules C in the first area Sb may continue to be aligned in the first direction A1. Thus, the second area Sa may display an image while the first area Sb maintains its transparent display state. In an example embodiment, the LCD device 20 may display a description of an image displayed in the first area Sb in the second area Sa, but the present invention is not limited thereto. In another example embodiment, the second area Sa may be driven along with the first area Sb, and an auxiliary screen may be provided for an image displayed in the second area Sa.

The rest of the LCD device 20 is substantially the same as the LCD device 10 of FIGS. 1 to 7, and thus, detailed descriptions thereof will be omitted.

While the present invention has been particularly shown and described with reference to example embodiments thereof, it will be understood by those of ordinary skill in the art that various suitable changes to the disclosed embodiments may be made without departing from the spirit and scope of the present invention as defined by the following claims, and equivalents thereof. The example embodiments should be considered in a descriptive sense, and not for purposes of limitation.

What is claimed is:
1. A liquid crystal display (LCD) device, comprising:
a lower polarizing plate configured to have a transmission axis in a first direction;
a liquid crystal layer on the lower polarizing plate;
an upper polarizing plate on the liquid crystal layer, the upper polarizing plate comprising a first polarizing plate and a second polarizing plate, the first polarizing plate having a transmission axis in the first direction, the second polarizing plate having a transmission axis in a second direction perpendicular to the first direction, the first and the second polarizing plates being at a same layer; and
a plurality of filters comprising a white filter and a colored filter, the white filter overlapping with the first polarizing plate having the transmission axis in the first direction, and the colored filter overlapping with the second polarizing plate having the transmission axis in a second direction,
wherein the liquid crystal layer is configured to align liquid crystal molecules overlapping with the first polarizing plate to be in the second direction to not permit backlight-emitted light to transmit through the first polarizing plate in response to a voltage being applied to the liquid crystal layer, and to realign the liquid crystal molecules to permit backlight-emitted light to transmit through the first polarizing plate and the white filter in response to no voltage being applied to the liquid crystal layer.

2. The LCD device of claim 1, further comprising:
an array substrate below the liquid crystal layer, the array substrate comprising a plurality of pixels arranged in a matrix; and
an encapsulation substrate above the liquid crystal layer and encapsulating the liquid crystal layer.

3. The LCD device of claim 2, wherein the lower polarizing plate is above or below the array substrate, and the upper polarizing plate is above or below the encapsulation substrate.

4. The LCD device of claim 2, wherein each of the pixels overlaps with the white filter or the colored filter.

5. The LCD device of claim 2, wherein each of the pixels comprises a plurality of sub-pixels, and each of the sub-pixels overlaps with the white filter or the colored filter.

6. The LCD device of claim 2, wherein the white filter and the colored filter are alternately arranged in a row direction or in a column direction.

7. The LCD device of claim 2, wherein the white filter and the colored filter are alternately arranged in a row direction and a column direction.

8. The LCD device of claim 1, wherein the liquid crystal layer comprises a plurality of liquid crystal molecules aligned in the first direction.

9. The LCD device of claim 8, wherein at least a portion of the plurality of liquid crystal molecules in a region overlapping with the first polarizing plate are configured to remain aligned in the second direction while a voltage is applied to the liquid crystal layer.

10. The LCD device of claim 8, wherein the liquid crystal molecules are configured to change their alignment according to a voltage applied to the liquid crystal layer.

11. An LCD display device, comprising:
an array substrate comprising a first area and a second area, the first area overlapping with a white filter, and the second area overlapping with a colored filter;
a liquid crystal layer on the array substrate; and
an upper polarizing plate and a lower polarizing plate facing each other with the array substrate interposed therebetween,
wherein the lower polarizing plate is configured to have a transmission axis in a first direction, the upper polarizing plate comprises a first polarizing plate having a transmission axis in the first direction, and a second polarizing plate having a transmission axis in a second direction that is perpendicular to the first direction, the first area overlaps with the first polarizing plate, and the second area overlaps with the second polarizing plate, the first and the second polarizing plates being at a same layer, and
wherein the liquid crystal layer is configured to align liquid crystal molecules overlapping with the first polarizing plate to be in the second direction to not permit backlight-emitted light to transmit through the first polarizing plate in response to a voltage being applied to the liquid crystal layer, and to realign the liquid crystal molecules to permit backlight-emitted light to transmit through the first polarizing plate and the white filter in response to no voltage being applied to the liquid crystal layer.

12. The LCD display device of claim 11, further comprising:
an encapsulation substrate facing the array substrate and seal the array substrate; and
a liquid crystal layer between the encapsulation substrate and the array substrate.

13. The LCD display device of claim 12, wherein the lower polarizing plate is located above or below the array substrate and the upper polarizing plate is located above or below the encapsulation substrate.

14. The LCD display device of claim 11, wherein the liquid crystal layer comprises a plurality of liquid crystal molecules aligned in the first direction.

15. The LCD device of claim 14, wherein at least a portion of the plurality of liquid crystal molecules in the first area are configured to remain aligned in the first direction while a voltage is applied to the liquid crystal layer.

16. The LCD device of claim 14, wherein the liquid crystal molecules are configured to change their alignment according to a voltage applied to the liquid crystal layer.

17. The LCD device of claim 11, wherein the first area and the second area are defined by an imaginary line that vertically or horizontally extends across the array substrate.

18. An LCD device, comprising:
an array substrate comprising a colored pixel and a white pixel;
a liquid crystal layer on the array substrate; and
an upper polarizing plate and a lower polarizing plate facing each other with the array substrate interposed therebetween,
wherein a first part of the upper polarizing plate overlapping with the white pixel has a transmission axis in the same direction as a transmission axis of the lower polarizing plate, and a second part of the upper polarizing plate overlapping with the colored pixel has a transmission axis in a direction perpendicular to the transmission axis of the lower polarizing plate, the first and second parts of the upper polarizing plate overlapping with the white pixel and the colored pixel being at a same layer, and
wherein the liquid crystal layer is configured to align liquid crystal molecules overlapping with the first part of the upper polarizing plate to be in the direction perpendicular to the transmission axis of the lower polarizing plate to not permit backlight-emitted light to transmit through the first part of the upper polarizing plate in response to a voltage being applied to the liquid crystal layer, and to realign the liquid crystal molecules to permit backlight-emitted light to transmit through the first part of the upper polarizing plate in response to no voltage being applied to the liquid crystal layer.

19. The LCD device of claim 18, the array substrate is further configured to maintain an alignment of liquid crystal molecules comprised in the white pixel in the direction perpendicular to the transmission axis of the lower polarizing plate, while the LCD device is displaying an image.

20. The LCD device of claim 18, wherein the colored pixel and the white pixel are defined by an imaginary line that vertically or horizontally extends across the array substrate.

* * * * *